United States Patent [19]

Eagens

[11] 4,201,350
[45] May 6, 1980

[54] RECONDITIONED SAND MULLER

[75] Inventor: Jeffrey D. Eagens, Cincinnati, Ohio

[73] Assignee: Brunswick Industrial Supply Company, Cleveland, Ohio

[21] Appl. No.: 941,975

[22] Filed: Sep. 13, 1978

Related U.S. Application Data

[62] Division of Ser. No. 808,361, Jun. 20, 1977, Pat. No. 4,126,922.

[51] Int. Cl.² .................................................. B02C 7/12
[52] U.S. Cl. ...................................... 241/298; 241/300; 241/DIG. 10
[58] Field of Search ................. 241/298, 300, DIG. 10

[56] References Cited

U.S. PATENT DOCUMENTS

| | | | |
|---|---|---|---|
| 1,508,031 | 9/1924 | Simpson | 241/DIG. 10 |
| 3,459,379 | 8/1969 | Brown | 241/298 X |
| 3,982,704 | 9/1976 | Palyi | 241/298 |
| 4,005,827 | 2/1977 | Frair et al. | 241/298 X |
| 4,036,443 | 7/1977 | Saltarelli | 241/298 X |

*Primary Examiner*—Richard B. Lazarus
*Attorney, Agent, or Firm*—Wood, Herron & Evans

[57] ABSTRACT

A sand muller reconditioning method and structure in which the bottom of the sand muller's vessel is reestablished into a generally planar or flat attitude after prolonged use of the muller has resulted in a wide groove-like circular wear path in that bottom beneath the sand muller's plow. The method and structure includes defining an inner circumferential seat, and an outer circumferential seat, in the vessel's bottom, those seats being disposed inside of and outside of, respectively, the circular wear path previously formed in the bottom. A wear plate comprised of multiple arcuate sections is then sized to fit in the inner and outer seats for eliminating the circular wear path, the wear plate being fixed to the vessel's bottom by bolts cooperating with tapped bores in the bottom. Preferably, and centrally of the wear plate between the inner and outer peripheral edges thereof, a spacer seat is also defined in the vessel's bottom, a spacer being located in the spacer seat to support the wear plate between its inner and outer peripheral edges as it is tightened down against the vessel's bottom by the bolts.

5 Claims, 4 Drawing Figures

U.S. Patent
May 6, 1980
4,201,350
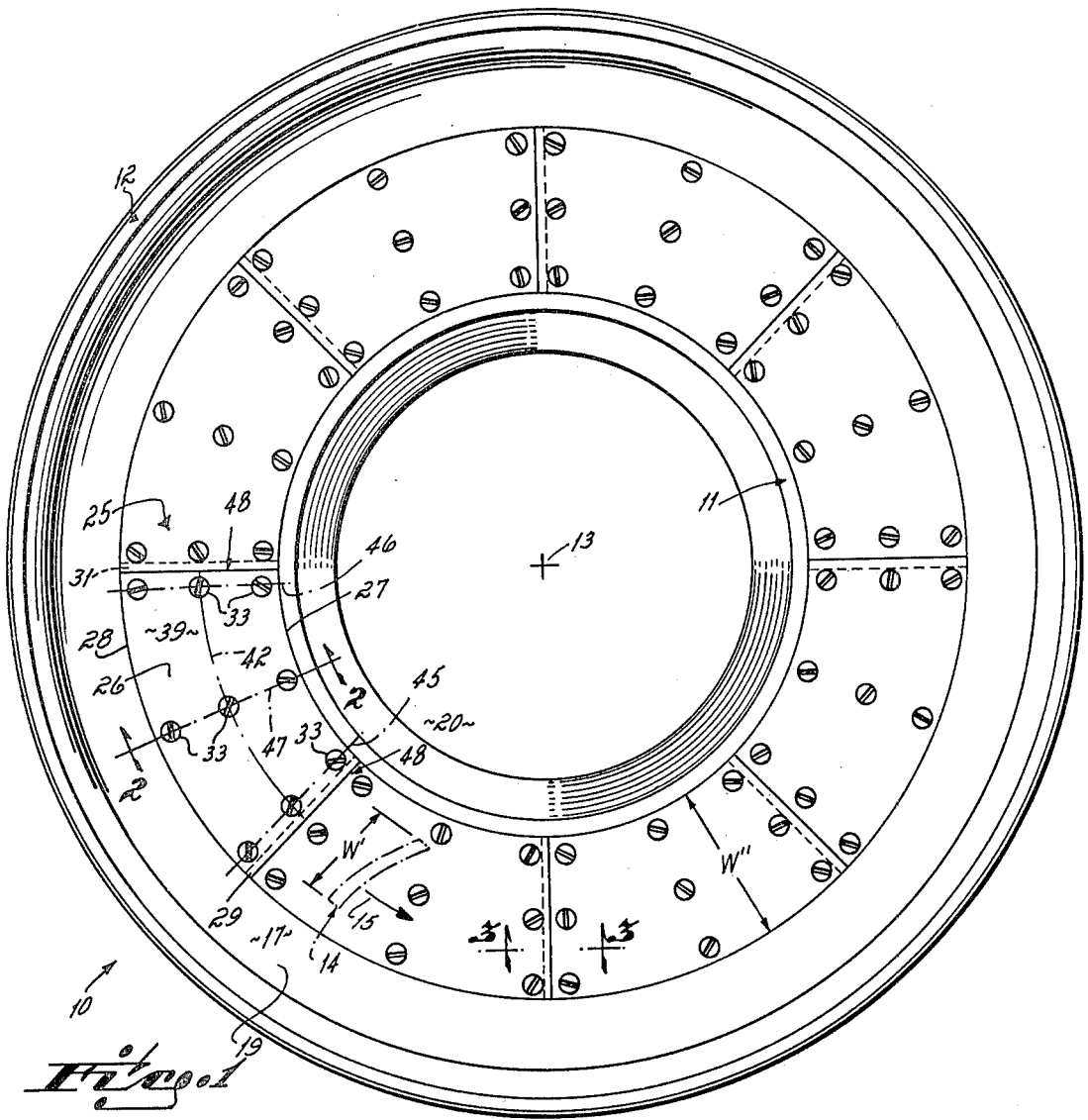
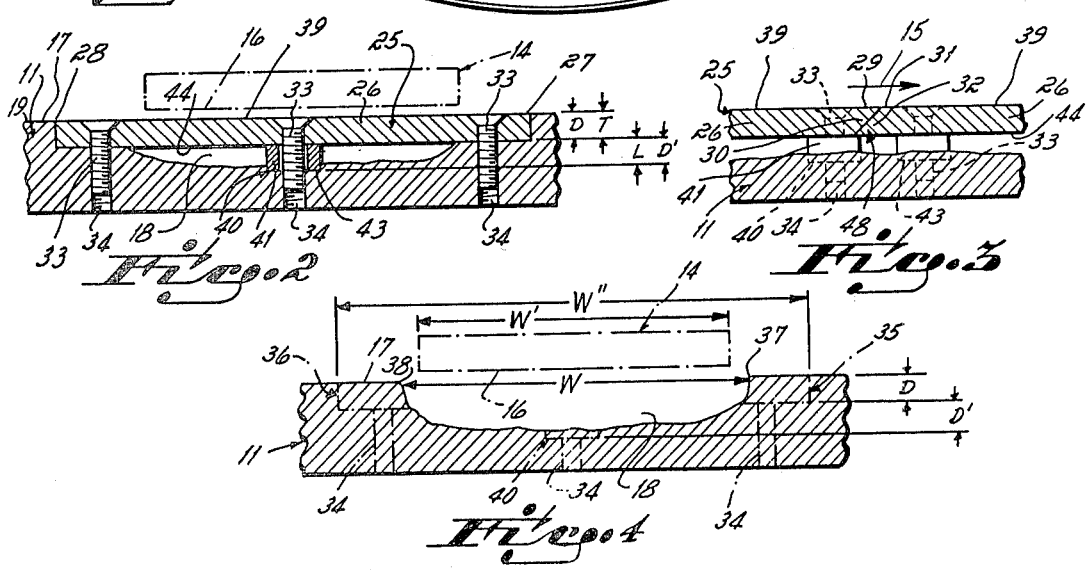

RECONDITIONED SAND MULLER

This is a division of application Ser. No. 808,361 filed June 20, 1977 now U.S. Pat. No. 4,126,922 granted Nov. 28, 1978.

This invention relates to sand mullers. More particularly, this invention relates to a sand muller reconditioning method and structure.

In the foundry industry, and after a casting run has been completed in a sand mold, it has long been the practice to remove the sand from the mold and then reuse that sand once again in a new sand mold. One way to recycle the used sand for future casting operations is by mulling that sand in a so-called sand muller, thereby reconditioning the used sand for reuse in subsequent new sand molds. The sand muller serves to crush or crumble any lumps of sand remaining in the lump form from use in the previous mold, and also serves to admix the previously used sand with any suitable bonding agent required. In other words, the sand muller functions to work or knead the sand, or sand mixture, so that the entire mass of sand will be thoroughly broken up and reduced to a condition of fineness appropriate for use in forming new sand mold therefrom.

A sand muller basically is comprised of a large cup-shaped receptacle or vessel that receives the sand, that vessel remaining stationary during use. The sand muller also includes mixing structure that rotates within the receptacle or vessel to admix the sand with any additional material added thereto, as well as to crush or crumble the lumps of sand into the desired fineness. One particular type of rotating muller element well known to the prior art is a plow or deflector-like structure which rotates around the center axis of the vessel closely adjacent the bottom of the vessel. The plow, as it rotates, serves to aid in breaking up any lumps in the sand as well as in aerating the sand, as well as in mixing whatever bonding agent is added with the sand.

In practice, the deflector-like plow that rotates about the vessel's vertical axis does so very closely adjacent, e.g., one-eighth of an inch or so above, the floor or bottom of the vessel. The bottom of a muller's vessel is commonly fabricated of cast iron and, of couse, sand is a very abrasive material. Thus, and over a period of time, a circumferential path or groove is worn into the bottom of the mulller's vessel due to the continuous abrasive action between the bottom edge of the plow blade and the surface of the vessel's bottom upon continual rotation of the plow blade with the muller full of sand. And after an extended period of time, the wear path or circumferential groove, which is generally approximately the radial width of the plow itself, tends to reduce the mixing efficiency of the sand muller.

Therefore, it has been the primary objective of this invention to provide a sand muller reconditioning method and structure in which the muller vessel's bottom may be reconditioned to eliminate the circumferential wear path or groove formed therein due to abrasion because of the muller plow's rotation in close proximity thereto.

In accord with this objective, this invetnion is directed to a sand muller reconditioning method and structure in which the bottom of the sand muller's vessel is reestablished into a generally planar or flat attitude after prolonged use of the muller has resulted in a wide groove-like circular wear path in that bottom beneath the sand muller's plow. The method and structure includes defining an inner circumferential seat, and an outer circumferential seat, in the vessel's bottom, those seats being disposed inside of and outside of, respectively, the circular wear path previously formed in the bottom. A wear plate comprised of multiple arcuate sections is then sized to fit in the inner and outer seats for eliminating the circular wear path, the wear plate being fixed to the vessel's bottom by bolts cooperating with tapped bores in the bottom. Preferably, and centrally of the wear plate between the inner and outer peripheral edges thereof, a spacer seat is also defined in the vessel's bottom, a spacer being located in the spacer seat to support the wear plate between its inner and outer peripheral edges as it is tightened down against the vessel's bottom by the bolts.

Other objectives and advantages will be more apparent from the following detailed description taken in conjunction with the drawings in which:

FIG. 1 is a top view of a sand muller's vessel reconditioned in accord with the principles of this invention;

FIG. 2 is a cross-sectional view taken along line 2—2 of FIG. 1;

FIG. 3 is a cross-sectional view taken along line 3—3 of FIG. 1; and

FIG. 4 is a cross-sectional view similar to FIG. 2 but prior to subjecting the vessel's bottom to the method and structure of this invention.

A sand muller's vessel 10, reconditioned in accord with the principles of this invention, is illustrated in FIG. 1. As shown in that Figure, the sand muller's vessel 10 basically includes a bottom 11, and an upstanding circular side wall 12, which cooperate to define the cup-shaped receptacle or bowl. The sand muller mixing apparatus, which rotates about center vertical axis 13 of the vessel 10, is not shown because it forms no part of this invention. However, the problem which this invention solves is caused by rotation of a plow 14, i.e., a deflector blade, illustrated in phantom lines, which rotates in a direction illustrated by arrow 15 about the vertical center axis 13 of the vessel 10. As particularly illustrated in FIG. 4, the plow's bottom edge 16 is particularly close to the planar bottom surface 17 of the vessel 10 in actual use. This bottom surface 17 of the vessel 10 is normally planar as the sand muller's vessel 10 is originally fabricated, but after prolonged use a circular groove or path 18 is worn into that bottom surface due to the abrading action on the surface by the material, i.e., sand, being worked within the vessel. This circular or annular groove 18 in the vessel's bottom 11, prior to treatment with the reconditioning method and prior to installation of the reconditioning apparatus, in accord with the principles of this invention is illustrated particularly in FIG. 4. Note particularly that the wear path 18 has a width W about equal to the effective radial width W' of the plow 14 relative to the center axis 13 of the vessel 10.

In accord with the principles of this invention, the sand muller's bottom 11 is reconditioned to eliminate the annular groove or path 18 worn into that bottom over a period of time due to rotation of the plow 14 and the abrasive action thereby generated by the sand on the vessel's bottom. In other words, the muller vessel's bottom 11 is reconditioned so as to provide a substantially planar bottom surface 17 from adjacent the outer peripheral edge 19 to adjacent the center area 20 of that bottom, i.e., to reestablish the bottom as initially fabricated. This objective is accomplished by providing a wear plate 25 comprised of a plurality of arcuate sections 26 in a circular configuration beneath the rotational path 15 of the plow 14. Each of the wear plate's sections 26 has an inner arcuate periphery 27 and an outer arcuate periphery 28, the center points of the arcs so defined being the vertical axis 13 of the vessel 10. Further, the leading edge 29 of each arcuate section 26 is provided with a top lip bevel 30, and the trailing edge 31 of each arcuate plate is provided with a bottom lip bevel 32, thereby permitting successive arcuate plate sections 26 to form a bevelled overlap at the joints of those successive arcuate sections as illustrated particularly in FIGS. 1 and 3. The radial width W" of each arcuate plate is at least slightly greater than the effective radial width W' of the muller's plow 14. The wear plate's arcuate sections 26 are held in fixed relation with the vessel's bottom 11 by bolts 33 engaged with threaded bores 34 provided in that bottom, see FIG. 2.

More particularly, and as illustrated in FIGS. 2 and 4, the vessel's bottom 11 is initially provided with an inner circular seat 35 and an outer circular seat 36, the center point of those seats being the vessel's center axis 13. The inner seat 35 for the wear plate 26 is defined in the bottom 11 radially inward of the inner edge 37 of the wear groove 18 in the bottom. Similarly, the outer seat 36 for the wear plate 25 is defined in the bottom 11 radially outward of the outer edge 38 of the wear groove 18 in the bottom. The wear plate's inner 35 and outer 36 seats are of a depth D equivalent to the thickness T of the wear plate 25 itself, thereby permitting a coplanar relationship of the wear plate's top surface 39 with the bottom's top surface 17 upon assembly of the wear plate with the bottom as illustrated particularly in FIG. 2.

Further, and preferably, a plurality of seats 40 for spacers 41 are provided in the bottom 11 on a circular locus of points 42 substantially centrally of the wear groove 18 as illustrated in FIG. 4, i.e., concentric with the circular seats 35, 36. Each spacer 41 is in the nature of a collar having a length L equal to the depth D' between the bottom 43 of the spacer seat 40 and the underside 44 of the wear plate 25 when the wear plate is assembled with the vessel's bottom. A bolt 33 is received in tapped bore 34 through each of the collar shaped spacers 41 to aid in restraining the associated section 26 in place. The spacers 41 offer significant support centrally of the circular wear plate 25, relative to the radial width W" of that wear plate, so as to aid in preventing undue stress of the vessel's bottom 11 and the wear plate's sections 26 upon tightening of the bolts 33 when assembling the wear plate 25 with the bottom 11.

As illustrated in FIG. 1, the circular wear plate's sections 26 are assembled in end-to-end relation circumferentially over the wear groove 18 in the vessel's bottom 11. Each wear plate section 26 is fixed to the bottom 11 on radial phantom lines 45, 46, 47, by three radially spaced bolts 33 at the leading edge 29 as on line 45, at the trailing edge 31 as on line 46, and centrally as on line 47 of that wear plate section. The three radially spaced bolts 33 on each phantom line 45–47 are, as previously mentioned, connected to the vessel's bottom 11 by virtue of tapped bores 34 provided therein. The bevelled overlap 30,32 established at each joint 48 between sections 26 is preferably positioned so that the undercut bevel 30 is on top of the tongued bevel 31, thereby minimizing wear at that joint due to abrasion by the sand upon rotation of plow 14.

Having described in detail the preferred embodiment of my invention, what I desire to claim and protect by Letters Patent is:

1. Re-conditioned sand muller structure wherein a previously formed generally circular wear path in a circular bottom of a sand muller's vessel is covered, said wear path being in the form of an irregular depth ring having an inner and an outer periphery, and said structure comprising:
   a first annular seat in said bottom beyond the outer periphery of said wear path, and have a pre-determined depth;
   a second annular seat in said bottom within the inner periphery of said wear path and having a pre-determined depth; said depths being equal and less than the maximum depth of said wear path;
   a wear plate means disposed over said wear path, said wear plate means having outer and inner circumferences respectively corresponding to the circumferences of said first and second annular seats;
   said wear plate means having a thickness approximately equal to the depth of said seats;
   the respective circumferences of said wear plate means being seated in respective ones of said first and second seats; and,
   a bottom surface of said wear plate means overlying surfaces of said wear path and being spaced therefrom.

2. Apparatus as in claim 1, wherein said wear plate means comprises a plurality of arcuate wear plate sections, each having a beveled end for cooperating with an adjacent section;
   a first section having a rearward end, with respect to the machine direction of the muller having an upwardly facing bevel in said machine direction; and,
   a following second section disposed cooperatively adjacent said first section, said second section having a leading downwardly beveled end cooperating in surface contact with the rearward end bevel of said first section.

3. Apparatus as in claim 1, wherein said wear plate means comprises a plurality of arcuate wear plate sections, each having beveled leading and trailing ends cooperating with adjacent plate sections, said beveled ends in each plate defining a surface inclined from a bottom of said plate section upwardly, in the machine direction of said muller.

4. A structure as set forth in claim 1, including a spacer seat disposed within said wear path between said peripheries, and, at least one spacer positioned in said spacer seat within said peripheries for supporting a portion of said wear plate means between said annular seats.

5. A structure as set forth in claim 4, said wear plate means including a plurality of separate arcuate plates, the inner and outer circumferences of those plates having the vessel bottom's center as the center point thereof, and corresponding to the respective dispositions of said first and second seats.

* * * * *